Aug. 15, 1950 W. N. MILLAR 2,519,270
DRIVING AND STEERING CONTROL FOR LAWN MOWERS
Filed Sept. 2, 1947 3 Sheets-Sheet 1
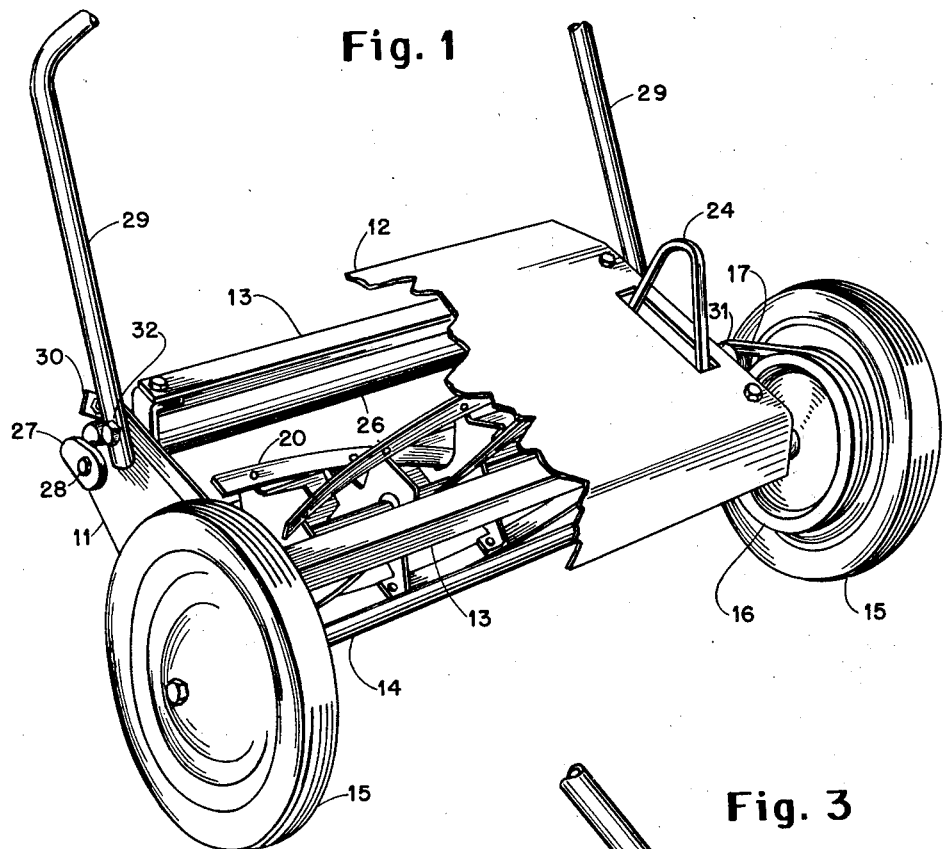
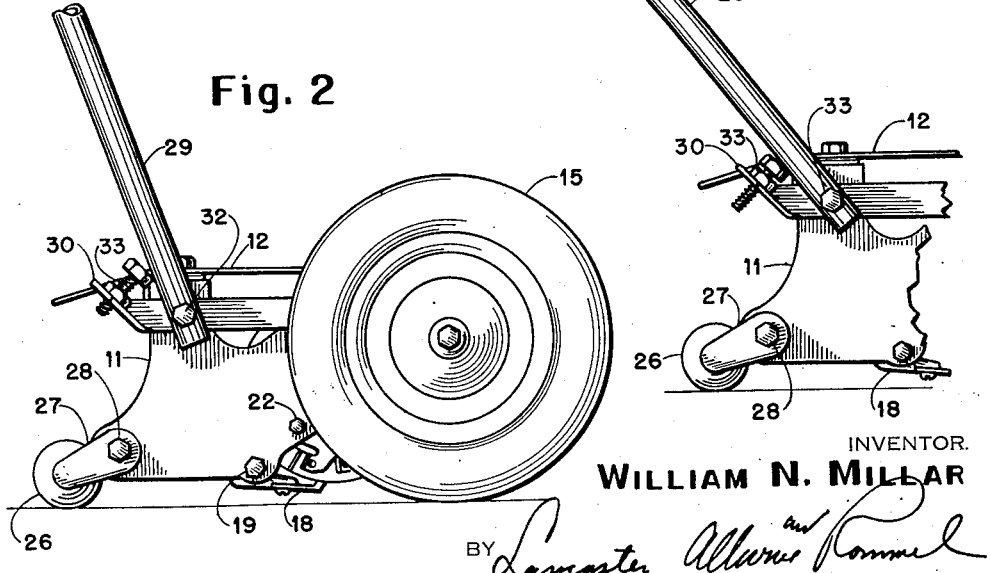
INVENTOR.
WILLIAM N. MILLAR
BY Lancaster, Allwine and Rommel
ATTORNEYS.

Aug. 15, 1950 W. N. MILLAR 2,519,270
DRIVING AND STEERING CONTROL FOR LAWN MOWERS
Filed Sept. 2, 1947 3 Sheets-Sheet 2
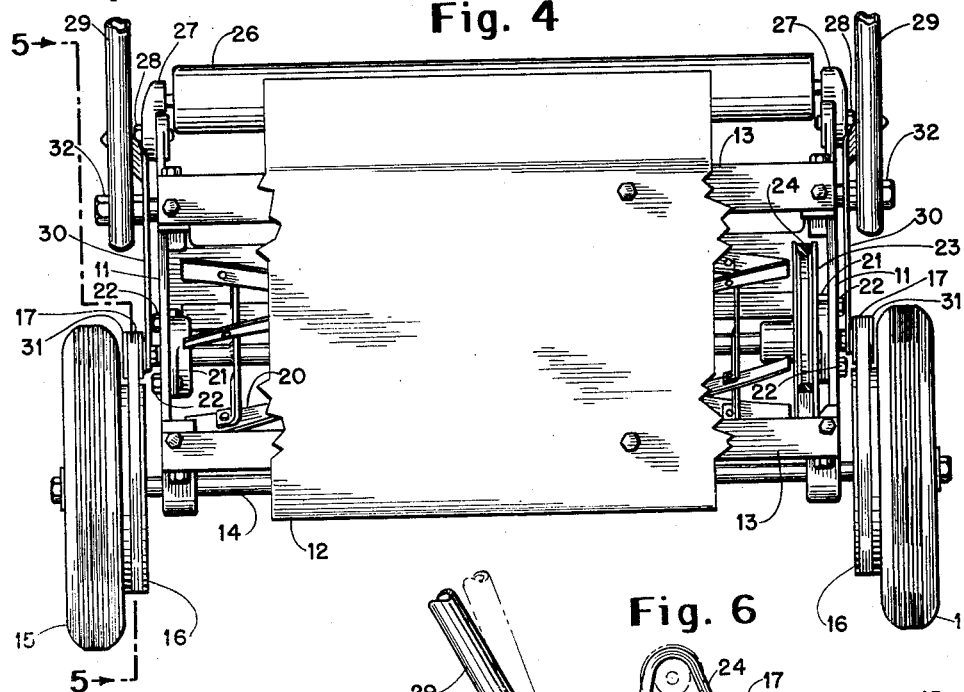
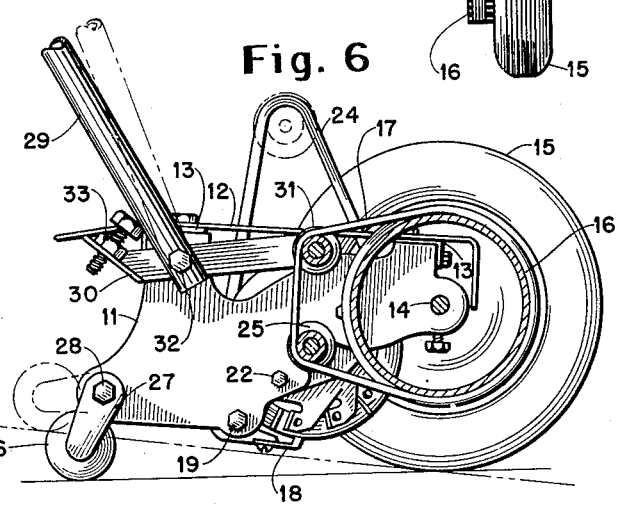
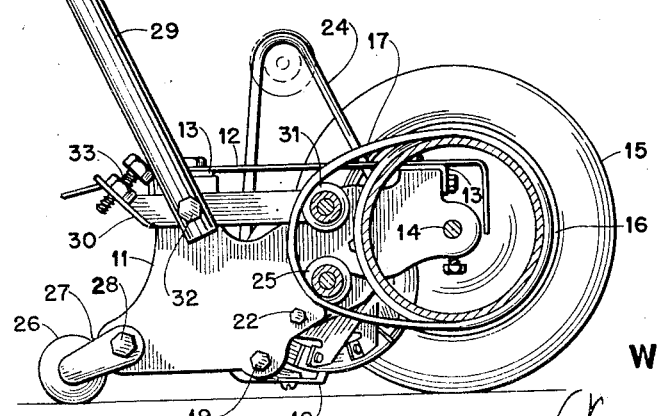
INVENTOR.
WILLIAM N. MILLAR
BY Lancaster, Allwine & Rommel
ATTORNEYS.

Aug. 15, 1950 W. N. MILLAR 2,519,270
DRIVING AND STEERING CONTROL FOR LAWN MOWERS
Filed Sept. 2, 1947 3 Sheets-Sheet 3

INVENTOR.
WILLIAM N. MILLAR
BY *Lancaster, Allwine & Rommel*
ATTORNEYS.

Patented Aug. 15, 1950

2,519,270

UNITED STATES PATENT OFFICE 2,519,270

DRIVING AND STEERING CONTROL FOR LAWN MOWERS

William N. Millar, Detroit, Mich.

Application September 2, 1947, Serial No. 771,769

4 Claims. (Cl. 180—6.2)

The present invention relates to a lawn mower structure, particularly a structure that is adapted to be power driven.

It is one object of the invention to provide a structure of the above type which employs a simple yet positive control of the motion of the mower.

Another object of the invention is to provide such a control that steering, stopping and starting are controlled from a single operator.

A still further object of the invention is to incorporate the above features into a unitary structure which will be simple to manufacture and relatively inexpensive in manufacturing costs.

Other and further objects are those inherent in the structure herein fully illustrated, described and claimed.

The invention is illustrated by the drawings in which—

Figure 1 is a perspective view of the device with parts broken away.

Figure 2 is a side elevation.

Figure 3 is a side elevation similar to Figure 2 showing a different adjustment on the handle contact screw.

Figure 4 is a top plan view with parts broken away.

Figure 5 is a cross section taken on line 5—5 of Figure 4.

Figure 6 is a view similar to Figure 5 illustrating adjustments of a belt-tightener and the roller.

Throughout the drawings and specification, like numerals indicate like parts.

Figure 7:
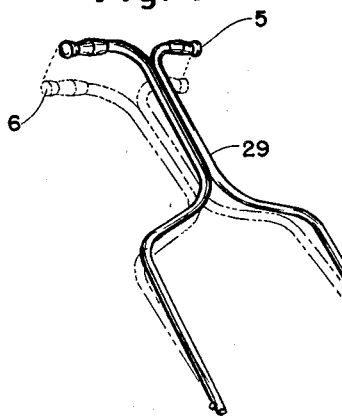
Figures 7 and 8 illustrate the handle adjustments to steer and drive the mower.

The lawn mower comprises a pair of side frames 11, an engine bed 12 and cross frames 13. The side frames 11 are connected by the cross frames 13 upon which is bolted the engine bed 12. The engine bed supports any suitable motor or engine (not shown) for driving the mower. An axle 14 is mounted in the forward part of the side frames 11 and is adapted to receive on opposite ends a pair of ground engaging driving wheels 15 provided with integral pulley sheaves 16 to receive a driving belt 17. A cutter blade 18 is mounted for adjustment in the lower portion of side frames 11 and secured thereto by bolts 19. A cutter reel 20 is mounted for rotation to the side frames 11 by means of bearing blocks 21 which are bolted to side frames 11 by means of stud bolts 22. The cutter reel 20 is provided with a main drive pulley 23 which is driven by the power device (not shown) through belt 24. A pair of wheel drive pulleys 25 are mounted on the opposite ends of the cutter reel 20 and drive the wheels 15 through belts 17. A roller 26 is secured to the rear portions of the side frame members 11 by means of bearing arms 27 which are adjustably secured to the side frames 11 by means of studs 28.

The control feature of the mower includes a semi-flexible tubular handle member 29 bifurcated to provide twin ends to be attached to the mower, a pair of idler arms 30, a pair of idler pulleys 31 secured to the forward ends of the idler arms 30 and receiving the belts 17. The lower bifurcated ends of the handle 29 along with the idler arms 30 are pivotally secured to the side frames 11 by means of pivot bolt 32. The idler arms 30 are provided with offset adjustable handle contacting member 33 by means of which the angle of the handle 29 may be varied to suit the individual user.

In the operation of the device the reel 20 is driven by a motor (not shown) through belt 24. The reel 20 in turning cuts grass in the normal manner in cooperation with the cutter bar 18. The drive pulleys 25 on the reel 20 drive belts 17 which, when the idler pulleys 31 are in good frictional engagement therewith, as in Figure 6, will drive the wheels 15 to propel the mower over the lawn. As is evident from Figures 5, 6 and 7 the raising and lowering of the handle 29 at the handle portions 5 and 6 engages and disengages the idler pulleys 31 with the belts 17 to control the forward movement.

Figure 8:
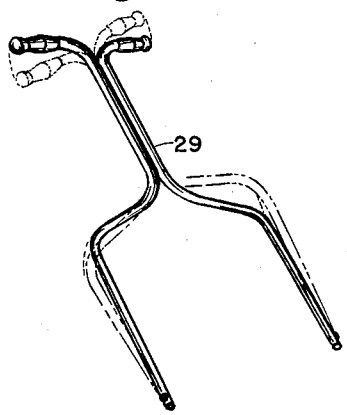
Figure 9:
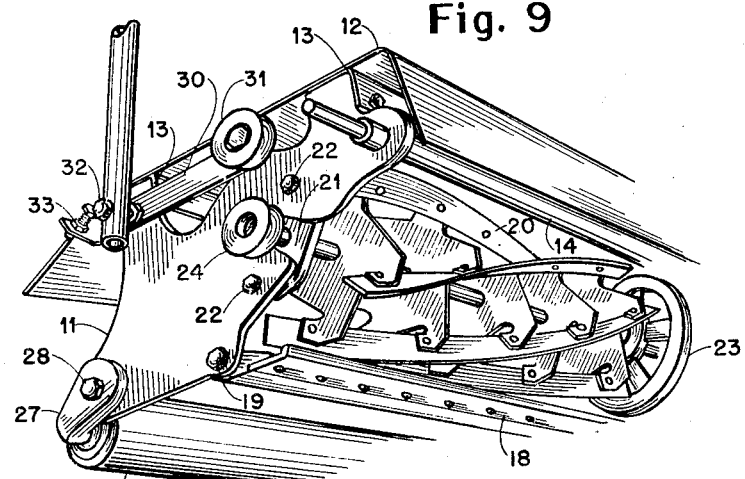
Figure 9 is a bottom perspective view illustrating the mower reel supporting mechanism.
Figure 10:
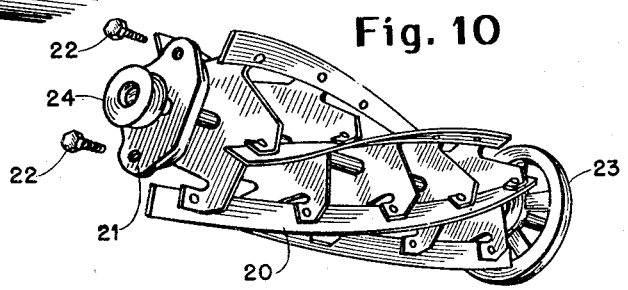
Figure 10 is a perspective view of the mower reel removed from the mower.

Twisting motion of the handle 29 as indicated in Figure 8 will engage one idler pulley 31 and release the other so that one wheel 15 is driving and the other not, this will of course cause the mower to pivot about the stationary wheel 15 and thereby be steered as the operator desires.

I claim:

1. In a power mower, spaced-apart frames; driving wheels; means for driving the wheels including a pulley for each frame and rotatably carried thereby, and a separate belt trained over each pulley; a semi-flexible, elongated handle member having a pair of end portions, with said end portions pivotally carried by said frames; an idler arm for each frame and being pivoted to its associated frame, said arm having opposite end portions; and a pulley rotatably mounted on each idler arm at one end portion of the arm, and with said belts trained over said last-named pulleys; each idler arm being provided with a projection, at its other end portion, with the projections disposed within the paths of travel of the adjacent end portions of said handle member, whereby said semi-flexible handle member may be rocked longitudinally to cause movement of said second named pulleys toward and away from said first-named pulleys, and said handle member may be flexibly canted transversely to cause movement of one of said second-named pulleys toward and away from one of said first-named pulleys.

2. In a power mower, spaced-apart frames; driving wheels; means for driving said wheels including a pair of rotatable members, rotatably carried by said frames; a semi-flexible elongated handle member having a pair of bifurcated end portions with said end portions pivotally carried by said frames; an idler arm, having opposite end portions, for each frame and pivoted to its associated frame; and means movable toward and away from said rotatable members to effect rotation of said rotatable members, including a pair of rotatable members carried at one end portion of each arm; each idler arm being provided with an abutment at its other end portion and adjacent the pivotal connection of each idler arm with its associated frame member, the abutments being disposed within the paths of travel of the adjacent end portions of said handle member, whereby said semi-flexible handle member may be rocked longitudinally to cause simultaneous movement of said second-named rotatable members toward and away from said first-named rotatable members, and said handle member may be flexibly twisted transversely to cause movement of one of said second-named rotatable members toward and away from one of said first-named rotatable members.

3. In a power mower, spaced-apart side frames; driving wheels rotatably carried by the side frames; means for driving said wheels including a pair of rotatable members, rotatably carried by said frames; a semi-flexible elongated handle member having a pair of bifurcated end portions with said end portions pivotally carried by said frames; an idler arm, having opposite end portions, for each frame and pivoted to its associated frame; and means movable toward and away from said rotatable members to effect rotation of said rotatable members, including a pair of rotatable members carried at one end portion of each arm; each idler arm being provided with an abutment at its other end portion and adjacent the pivotal connection of each idler arm with its associated frame member, the abutments being disposed within the paths of travel of the adjacent end portions of said handle member, whereby said semi-flexible handle member may be rocked longitudinally to cause simultaneous movement of said second-named rotatable members toward and away from said first-named rotatable members, and said handle member may be flexibly twisted transversely to cause movement of one of said second-named rotatable members toward and away from one of said first-named rotatable members.

4. In a power mower, spaced-apart side frames; driving wheels rotatably carried by the side frames; means for driving said wheels including a pair of rotatable members, rotatably carried by said frames; a semi-flexible elongated handle member extending upwardly and rearwardly of said side frames, and having a pair of bifurcated lower end portions with said end portions pivotally carried by said frames; an idler arm, having opposite end portions, for each frame and pivoted to its associated frame; and means movable toward and away from said rotatable members to effect rotation of said rotatable members, including a pair of rotatable members carried at one end portion of each arm; each idler arm being provided with an abutment at its other end portion and adjacent the pivotal connection of each idler arm with its associated frame member, the abutments being disposed within the paths of travel of the adjacent end portions of said handle member, whereby said semi-flexible handle member may be rocked longitudinally to cause simultaneous movement of said second-named rotatable members toward and away from said first-named rotatable members, and said handle member may be flexibly twisted transversely to cause movement of one of said second-named rotatable members toward and away from one of said first-named rotatable members.

WILLIAM N. MILLAR.

REFERENCES CITED

The following references are of record in the file of this patent:

UNITED STATES PATENTS

| Number | Name | Date |
| --- | --- | --- |
| 1,826,663 | Hessenbruch | Oct. 6, 1931 |
| 2,082,600 | Squires et al. | June 1, 1937 |
| 2,133,512 | Herge | Oct. 18, 1938 |
| 2,151,659 | Funk | Mar. 21, 1939 |
| 2,247,333 | Funk | June 24, 1941 |
| 2,283,161 | Booton | May 19, 1942 |
| 2,329,372 | Hitch | Sept. 14, 1943 |